3,222,342
POLYMERIZATION OF STYRENE UTILIZING FROZEN BORON TRIFLUORIDE ETHER COMPLEX AS THE CATALYST

Arthur D. Ketley, Silver Spring, Md., assignor to W. R. Grace & Co., New York, N.Y., a corporation of Connecticut
No Drawing. Filed July 13, 1961, Ser. No. 123,668
9 Claims. (Cl. 260—93.5)

This invention relates to the production of crystalline polystyrene by cationic polymerization. More particularly, it relates to the use of a frozen boron trifluoride ether complex to produce crystalline polystyrene.

In summary, this invention is directed to the production of crystalline polystyrene by freezing solid a boron trifluoride ether complex, diluting styrene in an inert hydrocarbon which is liquid at a temperature below the freezing point of the boron trifluoride ether complex and contacting the solid boron trifluoride ether complex with the solution of monomer at a temperature below the freezing point of the ether complex.

The use of a boron trifluoride ether solution to polymerize $\alpha$ p-dimethyl styrene in a liquid hydrocarbon reaction medium at low temperatures to produce a crystalline polymer is illustrated by Friedlander and Thomas, J. Polymer Sci., vol. 31, pages 215 to 216 (1958). This method, however, does not produce crystalline polystyrene.

Surprisingly, I have been able to prepare crystalline polystyrene by freezing the boron trifluoride ether complex before contacting it with the liquid hydrocarbon solution of styrene.

It is essential that the temperature at which the reaction is effected be below the freezing temperature of the boron trifluoride ether complex. In the case of boron trifluoride etherate the temperature of the reaction solution should be at least $-60°$ C. Such low temperatures may be obtained and maintained by the utilization of refrigerants such as solid carbon dioxide, liquefied ethylene and the like.

In order to effectively maintain the desired low reaction temperature, and to prevent the monomer from freezing, diluent hydrocarbons which are liquid at the reaction temperature must be used. Liquefied hydrocarbons, such as liquefied propane, liquefied butane, and chlorinated hydrocarbons such as methylene chloride and the like, are suitable.

For best results, the reaction should be carried out in a dry atmosphere, for example, under dry nitrogen or dry argon. The polymerization may take place conveniently at atmospheric pressure, or at reduced or elevated pressures.

In this invention, it is the surface layer of a catalyst which is effective in promoting the polymerization reaction. From this it follows that the amount of catalyst required to produce a given yield will be higher or lower depending on the surface area of the catalyst which is accessible to the monomer reactant. The reaction is carried out successfully by freezing the catalyst solid and dipping it into a pre-cooled hydrocarbon solution of the monomer, or by adding the pre-cooled monomer solution to the frozen catalyst.

After the rection is completed it is advisable to deactivate the catalyst, a procedure which will hereinafter be referred to as "quenching." This result is accomplished by treating the catalyst with a suitable quenching agent such as methanol. After quenching, the solid polymer is readily separated and dried to a powder which is crystalline to X-ray.

In carrying out this invention the boron trifluoride diethyl ether complex is preferred. Other boron trifluoride ether complexes which are suitable include lower dialkyl ethers, e.g., the dipropyl ether, ethyl methyl ether, dibutyl ether, diamyl ether and the like.

The invention will be further illustrated by the following examples. All of the examples were carried out under an inert atmosphere of nitrogen. The specific viscosity was measured by dissolving 0.1 g. of the polymer in 100 cc. decalin at 135° C.

Example I 30 cc. styrene was added to 180 cc. butane and the solution was cooled to a temperature of $-78°$ C. A cooling bath of acetone and solid carbon dioxide was used to attain and maintain the temperature at $-78°$ C. A glass rod was dipped into boron trifluoride diethyl ether and then into liquid nitrogen so that a layer of frozen solid boron trifluoride etherate covered the rod. The catalyst covered rod was dipped into the pre-cooled butane solution of styrene. Extremely rapid polymerization took place until a layer of polymer covered the exposed solid catalyst surface. The polymerization then ceased. The rod was pulled out of the solution and dipped into methanol to inactivate the catalyst. The solid polymer was filtered from the liquid, washed again with methanol to inactivate any residue catalyst, and placed in a vacuum oven to dry. The dried polymer was in the form of a fine powder. It was crystalline to X-rays and had a specific viscosity of 0.44.

Example II

Boron trifluoride diethyl ether was poured into a 500 cc. Erlenmeyer flask so as to just cover the bottom of the flask. The layer of catalyst was frozen solid by placing the flask in liquid nitrogen. A solution of 25 cc. styrene and 250 cc. butane, pre-cooled to $-80°$ C., was poured into the flask and the whole immersed in a cooling bath of acetone and solid carbon dioxide maintained at a temperature of $-80°$ C. A layer of polymer formed rapidly over the surface of the frozen catalyst. The reaction mixture was left over night and then filtered. The solid polymer was washed with methanol to quench the catalyst, filtered and washed again with methanol to remove any residue of catalyst. After filtration, the polymer was placed in a vacuum oven to dry. The dried polymer was in the form of a fine white powder which was crystalline to X-rays and which had a sharp X-ray peak at $17.9°$. The product had a softening point of $147°$ C.

The high molecular weight product of this invention is particularly suitable for thermoplastic molding operations, especially with fillers such as the inert inorganic pigments, including carbon black, barytes, clays and the like, and also with various organic fillers such as wood flour and cotton linters.

I claim:
1. The method of producing crystalline polystyrene which comprises freezing solid a boron trifluoride ether complex, the ether being a lower dialkyl ether, diluting styrene in an inert solvent which is liquid at a temperature below the freezing point of the boron trifluoride ether complex, and contacting the solid boron trifluoride ether complex with the solution of monomer at a temperature below the freezing point of the boron trifluoride ether complex.
2. The process according to claim 1 wherein the boron trifluoride ether complex is boron trifluoride diethyl ether.
3. The process according to claim 1 wherein the process is carried out under a substantially dry atmosphere.
4. The process according to claim 1 wherein the solvent is butane.
5. The process according to claim 1 wherein the process is carried out at atmospheric pressure.

6. The method of preparing crystalline polystyrene comprising contacting a solution of styrene in an inert solvent having a temperature of not greater than about −60° C. with a catalyst prepared by freezing a complex of boron trifluoride with a lower dialkyl ether.

7. The method according to claim 6 in which the catalyst is dipped into the styrene solution.

8. The method according to claim 6 in which the ether is diethyl ether and the solvent is butane.

9. The method of preparing crystalline polystyrene comprising adding a solution of styrene in a hydrocarbon solvent pre-cooled to at least about −78° C. to a solid boron trifluoride ether complex, the ether being a lower dialkyl ether.

References Cited by the Examiner

UNITED STATES PATENTS 2,559,062   7/1951   Dornte _____ 260—93.5

JOSEPH L. SCHOFER, Primary Examiner.

M. LIEBMAN, Examiner.